United States Patent
Yeoum et al.

(10) Patent No.: US 8,244,877 B2
(45) Date of Patent: Aug. 14, 2012

(54) METHOD AND SYSTEM FOR PROCESSING A CONTROL MESSAGE IN AN INTERNET PROTOCOL-BASED MOBILE COMMUNICATION SYSTEM SUPPORTING A MULTIMEDIA SERVICE

(75) Inventors: Tae-Sun Yeoum, Seoul (KR); Han-Na Lim, Siheung-si (KR); O-Sok Song, Suwon-si (KR); Joon-Ho Jung, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 547 days.

(21) Appl. No.: 11/726,241

(22) Filed: Mar. 21, 2007

(65) Prior Publication Data

US 2009/0125626 A1   May 14, 2009

(30) Foreign Application Priority Data

Mar. 21, 2006  (KR) ........................ 10-2006-0025869
Aug. 22, 2006  (KR) ........................ 10-2006-0079598

(51) Int. Cl.
*G06F 15/16* (2006.01)

(52) U.S. Cl. ................ 709/227; 709/230; 709/232

(58) Field of Classification Search ............ 709/230, 709/227, 232
See application file for complete search history.

(56) References Cited

U.S. PATENT DOCUMENTS

| | | | |
|---|---|---|---|
| 6,779,017 B1 * | 8/2004 | Lamberton et al. | 709/203 |
| 2004/0152439 A1 | 8/2004 | Kimura et al. | |
| 2004/0152469 A1 | 8/2004 | Yla-Outinen et al. | |
| 2005/0041617 A1 | 2/2005 | Huotari et al. | |
| 2005/0155036 A1 * | 7/2005 | Tiainen et al. | 719/310 |
| 2005/0286495 A1 | 12/2005 | Menon et al. | |
| 2006/0047820 A1 | 3/2006 | Sung et al. | |

FOREIGN PATENT DOCUMENTS

| | | |
|---|---|---|
| EP | 1 089 515 | 9/2000 |
| JP | 2002-204306 | 7/2002 |
| JP | 2003-122732 | 4/2003 |
| JP | 2003-242057 | 8/2003 |
| JP | 2004-056379 | 2/2004 |
| JP | 2004-118629 | 4/2004 |
| JP | 2008-505540 | 2/2008 |
| KR | 1020050103050 | 10/2005 |
| WO | WO 03/007160 | 1/2003 |
| WO | WO 2005/064896 | 7/2005 |

* cited by examiner

*Primary Examiner* — Ario Etienne
*Assistant Examiner* — Hee Kim
(74) *Attorney, Agent, or Firm* — The Farrell Law Firm, P.C.

(57) ABSTRACT

A method and system for processing a message in an Internet protocol-based mobile communication system supporting a multimedia service. In the system, application servers include a representative application server and multiple backend application servers. A method for defining a control message between application servers to set up a session using the standard Internet protocol is provided. When an application server performs a call processing operation, control message processing load and control message transmission delay is reduced.

8 Claims, 11 Drawing Sheets

METHOD AND SYSTEM FOR PROCESSING A CONTROL MESSAGE IN AN INTERNET PROTOCOL-BASED MOBILE COMMUNICATION SYSTEM SUPPORTING A MULTIMEDIA SERVICE

PRIORITY

This application claims priority under 35 U.S.C. §119(a) to Korean Patent Applications entitled "Method and System for Processing a Control Message in an Internet Protocol-Based Mobile Communication System Supporting a Multimedia Service", filed in the Korean Intellectual Property Office on Mar. 21, 2006 and Aug. 22, 2006, respectively assigned Serial Nos. 2006-25869 and 2006-79598, the contents of both of which are incorporated herein by reference.

BACKGROUND OF THE INVENTION

1. Field of the Invention

The present invention relates generally to an Internet Protocol (IP)-based mobile communication system supporting a multimedia service, and more particularly to a method and system for processing a control message.

2. Description of the Related Art

IP-based systems are provided with multiple servers for processing service requests by distributing multiple users whose service requests are concentrated on a specific IP address.

As the number of subscribed users increases, the number of messages to be simultaneously processed increases. In this case, an IP Multimedia Subsystem (IMS) should increase the call processing capacity of an application server for an application program mapped to an associated service on the basis of IP network system characteristics or should distribute the users using multiple application servers.

Among methods for distributing the users, the most direct method is to distribute load across an arbitrary application server by installing multiple application servers with the same function and dividing and registering information of multiple subscribers in a predefined home subscriber server.

However, a method for statically pre-allocating an application server on the basis of subscriber information is disadvantageous in that operation and maintenance costs increase since the subscriber information should be periodically updated under variable operating environments. Moreover, there is a problem in that a user can never use any service when the operation of a specific application server allocated to the user is stopped.

A method for dynamically allocating a user to an application server involves configuring a logical application server into which multiple application servers are integrated through a distributor. At least one distributor distributes load by selecting one application server from among the multiple application servers and processing and sending a request message received from a user. At this time, since distributors share user allocation information for the application servers, the user request may be constantly processed in the same application server even though the user request passes through any distributor. Since the request message should pass through a distributor in the dynamic allocation method, re-transmission may lead to delay. When a non-standard control protocol is used between application servers for the load distribution, it may not be applied between heterogeneous application servers.

There is currently a need for a method for distributing load by dynamically allocating an application server in an existing IMS system.

SUMMARY OF THE INVENTION

An aspect of the present invention is to address at least the above problems and/or disadvantages and to provide at least the advantages described below. Accordingly, an aspect of the present invention is to provide a method and system for processing a call control message in an IP-based mobile communication system supporting a multimedia service.

An aspect of the present invention is to provide a method and system for sending and receiving a control message through a Session Initiation Protocol (SIP) in which a control message of an application layer is processed in an Internet-based mobile communication system supporting a multimedia service.

An aspect of the present invention is to provide a method and system for sending and receiving a control message between at least one higher server and multiple lower servers through an SIP in an Internet-based mobile communication system supporting a multimedia service.

An aspect of the present invention is to provide a method and system for reducing load when an application layer processes a control message if a User Equipment (UE) sets the application layer to a user agent in an Internet-based mobile communication system supporting a multimedia service.

In accordance with an aspect of the present invention, there is provided a method for processing a control message supporting a multimedia service in an IP-based mobile communication system, including sending a request message for a session from a UE to an IMS through an SIP, the IMS being an Internet network supporting the multimedia service, sending the request message from a representative application server of the IMS to a lower application server selected from among multiple lower application servers, and processing, by the selected lower application server, the request message and sending a response message to the UE.

In accordance with an aspect of the present invention, there is provided a method for reducing load to process a control message of an application layer in an Internet-based mobile communication system supporting a multimedia service, including sending a session request message including call identifier information from a UE to a serving server through an SIP, sending the session request message including an address of the serving server in a record-route header from the serving server to a representative application server of an application layer, allocating, by the representative application server, a backend application server for processing the session request message and sending the session request message to the allocated backend application server, processing, by the backend application server, the session request message and sending a response message including path record information of the backend application server in the record-route header to the UE, and setting, by the UE, the path record information of the record-route header of the response message to path information for sending a subsequent request message within the same session and sending the subsequent request message including the same call identifier information to the allocated backend application server through the session initiation protocol.

In accordance with an aspect of the present invention, there is provided a method for reducing load to process a control message of an application layer in an Internet-based mobile communication system supporting a multimedia service, including sending a session request message including call identifier information from a UE to a serving server through an SIP, sending the session request message including an address of the serving server in a record-route header from the serving server to a representative application server of an application layer, allocating, by the representative application server, a backend application server for processing the session request message and sending the session request message to the allocated backend application server, processing, by the backend application server, the session request message and sending a response message including path record information of the backend application server in the record-route header to the UE, receiving, by the user equipment, the response message and sending a subsequent request message including the call identifier information to the serving server through the SIP, and checking, by the serving server, path record information of the record-route header of the subsequent request message and sending the subsequent request message to the allocated backend application server.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. The matters defined in the description such as a detailed construction and elements are provided to assist in a comprehensive understanding of preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for the sake of clarity and conciseness.

In the present invention, an IMS system sends a control message required for processing a call of a user using an SIP. Herein, an application server group including a representative AS and multiple backend ASs is defined, and a control message transmission/reception between the ASs in a hierarchical structure is defined using the SIP. Thus, a scheme is provided which can extend call processing capacity and distribute load for multimedia service support.

Figure 1:
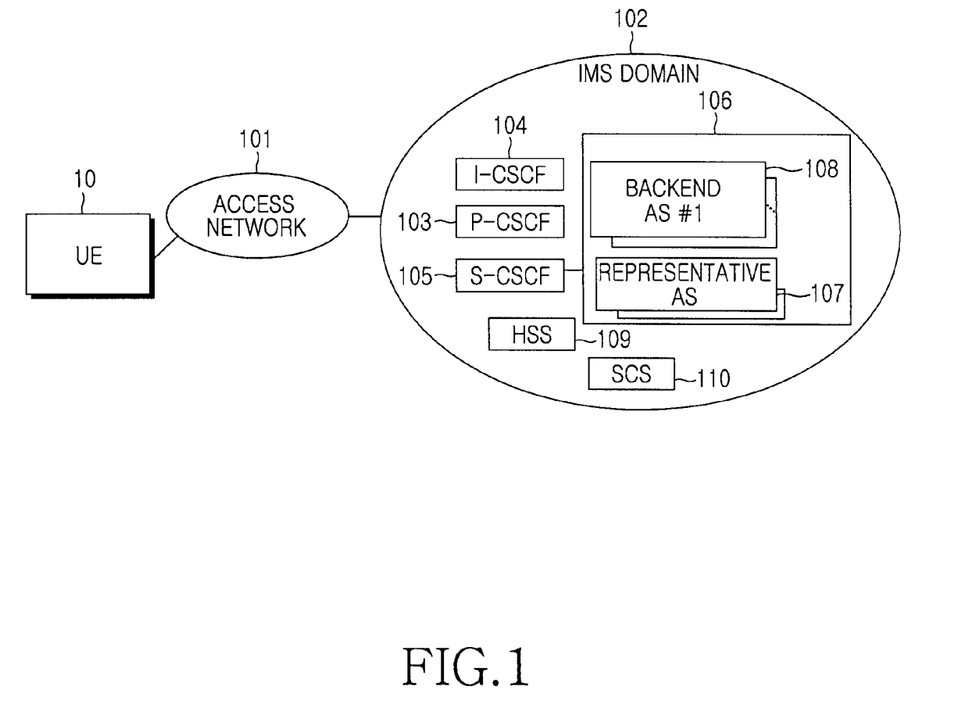
FIG. 1 illustrates a structure of an IMS in accordance with the present invention.

FIG. 1 illustrates a structure of an IMS provided with hierarchical ASs in accordance with the present invention.

Referring to FIG. 1, a UE 10 communicates with an IMS domain 102 including an AS group 106 via an access network 101. The IMS domain 102 is an IP-based network supporting a multimedia service.

The IMS domain 102 is provided at least with a Proxy-Call Session Control Function (P-CSCF) 103, an Interrogating-Call Session Control Function (I-CSCF) 104, a Serving-Call Session Control Function (S-CSCF) 105, the AS group 106 for providing specific voice and data services and a Home Subscriber Server (HSS) 109 for storing subscriber information of the UE 10.

In a preferred embodiment of the present invention, the AS group 106 has a hierarchical structure. That is, the AS group 106 is provided with at least one or two representative ASs 107 serving as higher ASs and multiple backend ASs 108 serving as lower ASs.

If needed, the IMS system can further include a Service Context Server (SCS) 110 serving as a special database for storing allocation information of the backend ASs 108 available in the representative AS 107. The SCS 110 can be provided in the HSS 109 according to network structure.

Next, a control signal (message) flow in the IMS will be briefly described.

The UE 10 sends a request message mapped to a specific service through the SIP. The access network 101 sends a received service request message to the IMS domain 102. The P-CSCF 103 is a server acting as the entry in the IMS domain 102 and can ensure a service connection by minimizing the latency of the service connection for the UE 10 according to characteristics of a proxy server.

The I-CSCF 104 is a server for performing guidance such that request messages received from multiple subscribers including the UE 10 can be properly sent to the associated S-CSCF 105. The I-CSCF 104 performs a routing operation for properly distributing and sending the request messages.

The S-CSCF 105 is a server for actually processing a request message. The S-CSCF 105 receives a request from the UE 10 and sends the request to an associated AS. The S-CSCF 105 acts as a switch for processing a control signal(s) mapped to the request message with a network of a different IMS domain. The request message sent from the UE 10 is a call processing control signal to be sent from the S-CSCF 105 to the AS 106.

At this time, information regarding the associated AS group 106 for receiving the request message should be pre-registered in subscriber information of the UE 10. The subscriber information is an SIP Uniform Resource Indicator (SIP URI) or Tel URI. The subscriber information is stored in the HSS 109.

When receiving an associated service request from the UE 10, the S-CSCF 105 sends the received request to the associated AS group 106 for processing a service on the basis of content registered in the subscribed information.

In the AS group 106, the representative AS 107 and the multiple backend ASs 108 are nodes for performing communication through the SIP protocol.

Specifically, the representative AS 107 receives a request message from the UE 10 through the S-CSCF 105 and sends the received request message to a specific backend AS. If a backend AS 108 pre-allocated to the UE 10 is present, the request message of the UE 10 is sent to the allocated AS 108. If an AS allocated to the UE 10 is absent, the representative AS 107 allocates an arbitrary AS while considering the load distribution and sends the request message to the allocated AS. At this time, backend AS allocation information can be stored in the representative AS or can be stored and used in the SCS 110. A time at which the backend AS 108 is allocated or de-allocated can differ according to service.

When the request message is not related to a previous SIP dialog, that is, a request message of an arbitrary UE does not need to be continuously processed or the SCS 110 for storing the allocation information is used, the representative AS 107 does not need to store the allocation information. In this case, there is an advantage in that the representative AS 107 is operable as a state-less proxy server.

After processing the request message of the UE, the specific backend AS 108 adds its own address to a record-route header containing SIP path record information in order to process a subsequent request message in the same SIP session.

Particularly, in the present invention, the representative AS 107 enables the S-CSCF 105 to directly send subsequent requests to the backend AS 108 by recording an address of the backend AS 108 as path record information without adding an address of the representative AS 107 to the record-route header.

As described above, a transmission of a subsequent request message generated from the UE 10, that is, a path through which the message generated from the UE 10 should pass, is set in path information using a route header. At this time, the path information follows the path record information of the record-route header included in a response to a previous request message.

In the present invention, a subsequent request message to be sent from the UE 10 is directly sent to the backend AS 108 without passing through the representative AS 107 on the basis of the path information of the record-route header included in the response to the previous request message.

Therefore, the present invention is advantageous in that a transmission-delay time between IMS network entities is reduced when the subsequent request message is sent.

Figure 2A:
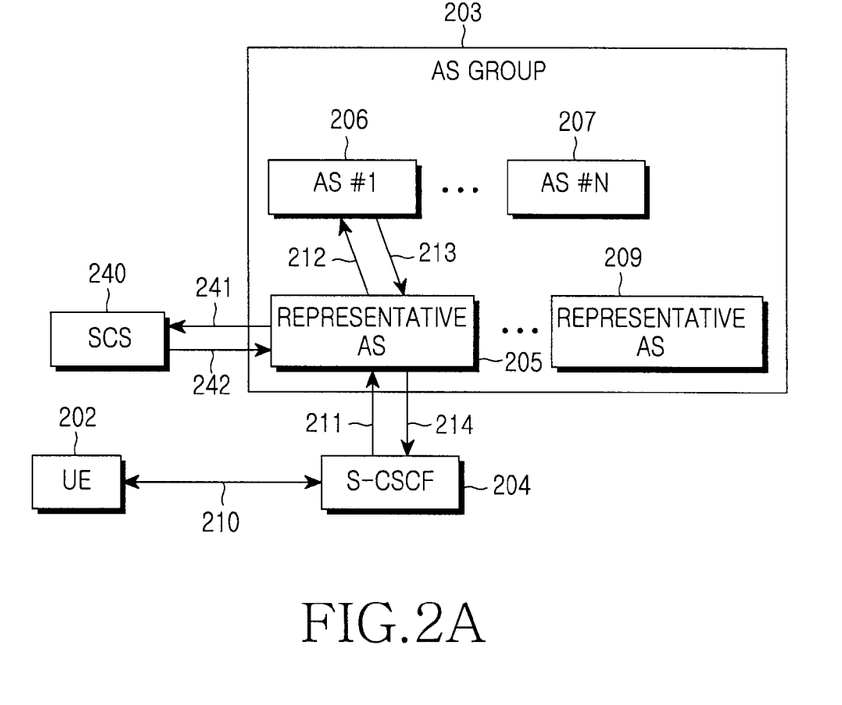
FIG. 2A illustrates a control message transmission flow between IMS network entities when an initial request is received in accordance with the present invention.

FIG. 2A illustrates a message transmission/reception between a representative AS and a backend AS when the representative AS receives an initial request message in accordance with the present invention.

Referring to FIG. 2A, an initial request message 210 sent from a UE 202 to an S-CSCF 204 is sent to a representative AS 205 or 209 (as indicated by reference numeral 211). At this time, the S-CSCF 204 adds its own address to path record information of the request message. If the number of representative ASs 205 and 209 of an AS group 203 is two or more, the S-CSCF 204 arbitrarily selects one specific representative AS 205 from the representative ASs 205 and 209 according to network state and then sends the initial request message 210 to the selected representative AS 205. When receiving the request message, the representative AS 205 determines whether there is a backend AS allocated to the UE 202 from which the request message has been sent. If no allocated backend AS is present, a backend AS proper for the load distribution is allocated.

At this time, allocation information can or cannot be stored in the representative AS 205 in which the request message has been received or a special database 240 for managing the allocation information. Then the request message is sent to an allocated backend AS #1 206 (as indicated by reference numeral 212).

The representative AS 205 does not add its own address to the path record information. However, the backend AS #1 206 provides the representative AS 205 with a response message indicating that the request message has been normally sent after adding an address of the backend AS #1 206 to path record information of a processed request message 213. Alternatively, the response message to the processed request message can be directly sent from the backend AS #1 206 to the S-CSCF 204 without passing through the representative AS 205.

Figure 2B:
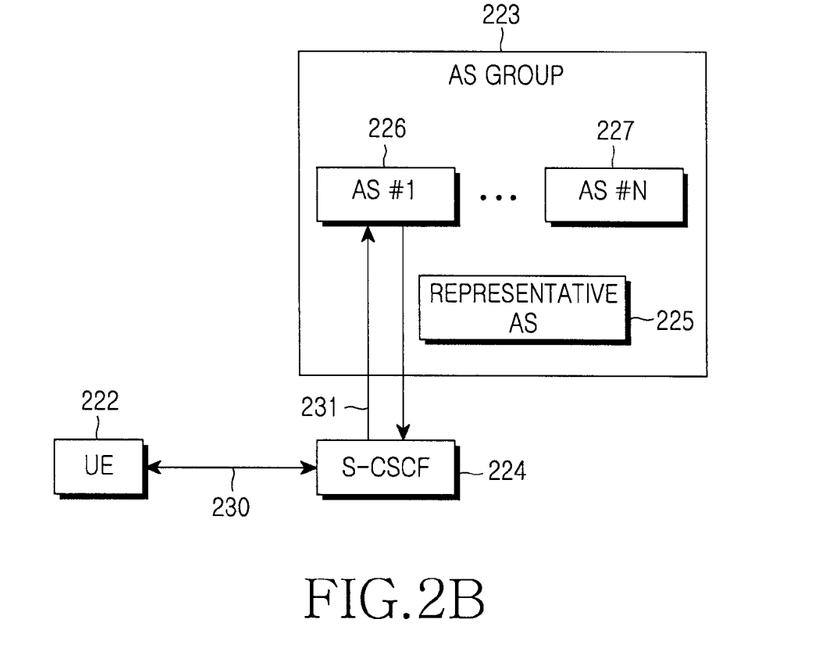
FIG. 2B illustrates a control message transmission flow in an Application Server (AS) group when a subsequent request is received in accordance with the present invention.

FIG. 2B illustrates a message transmission/reception between a representative AS and a backend. AS and a message transmission/reception between the representative AS 205 or 209 of FIG. 2A and the SCS 240 of FIG. 2A, when the representative AS receives a subsequent request message, in accordance with the present invention. In FIG. 2B, the message transmission/reception between the representative AS 205 or 209 and the SCS 240 can be omitted according to setting of the representative AS 205 or 209.

A path of a subsequent request message of a UE 222 uses path record information collected at the time of processing and sending an initial request message. That is, path record information from which a representative AS 225 is excluded is included and transmitted in a route header of the subsequent request message. Thus, the subsequent request message of the UE 222 is directly sent from an S-CSCF 224 to a backend AS #1 226.

As a result, request messages sent from the UE 222 can be distributed and processed. There is an advantage in that a message transmission/reception between IMS network entities is not delayed when a subsequent request message is processed.

Figure 3:
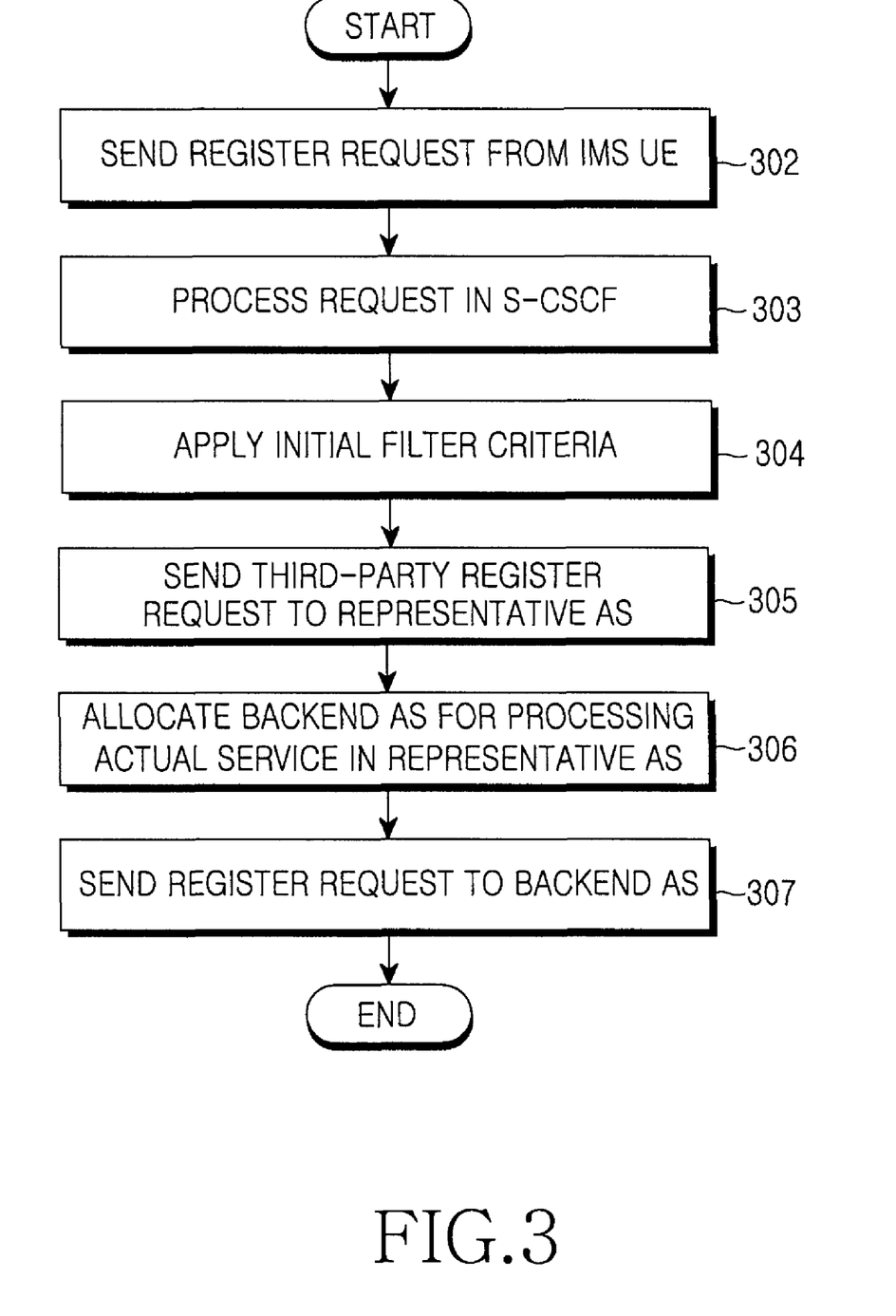
FIG. 3 illustrates a process in which a UE is registered in an IMS in accordance with the present invention.

FIG. 3 illustrates a process in which a UE is registered in an IMS domain and a representative AS allocates a backend AS to the UE in accordance with the present invention.

Referring to FIG. 3, when the UE sends a REGISTER request message to the IMS domain in step 302, an S-CSCF processes the REGISTER request message in step 303. In step 304, the S-CSCF applies initial filter criteria of the UE and registers a third party for processing the request message. Herein, the third party is a third SIP node for receiving the REGISTER request message processed by the S-CSCF for reference and is an AS group in a preferred embodiment of the present invention. In step 305, the S-CSCF sends a third-party REGISTER request message to a representative AS.

Filtering indicates a procedure for checking criteria of the request message from the UE and sending the message to a specific representative AS that can process the message.

In step 306, the representative AS in which the REGISTER request message of the UE from the S-CSCF has been received determines whether there is a pre-allocated backend AS mapped to subscriber information of the UE. If the pre-allocated backend AS is absent, the representative AS allocates a proper backend AS while considering a load state in the AS group and stores information regarding the allocated backend AS. In step 307, the representative AS sends the REGISTER request message of the UE to the allocated backend AS, thereby requesting that the backend AS should register the UE. This overall process is equally applied to re-registration and de-registration processes of the UE.

Figure 4A:
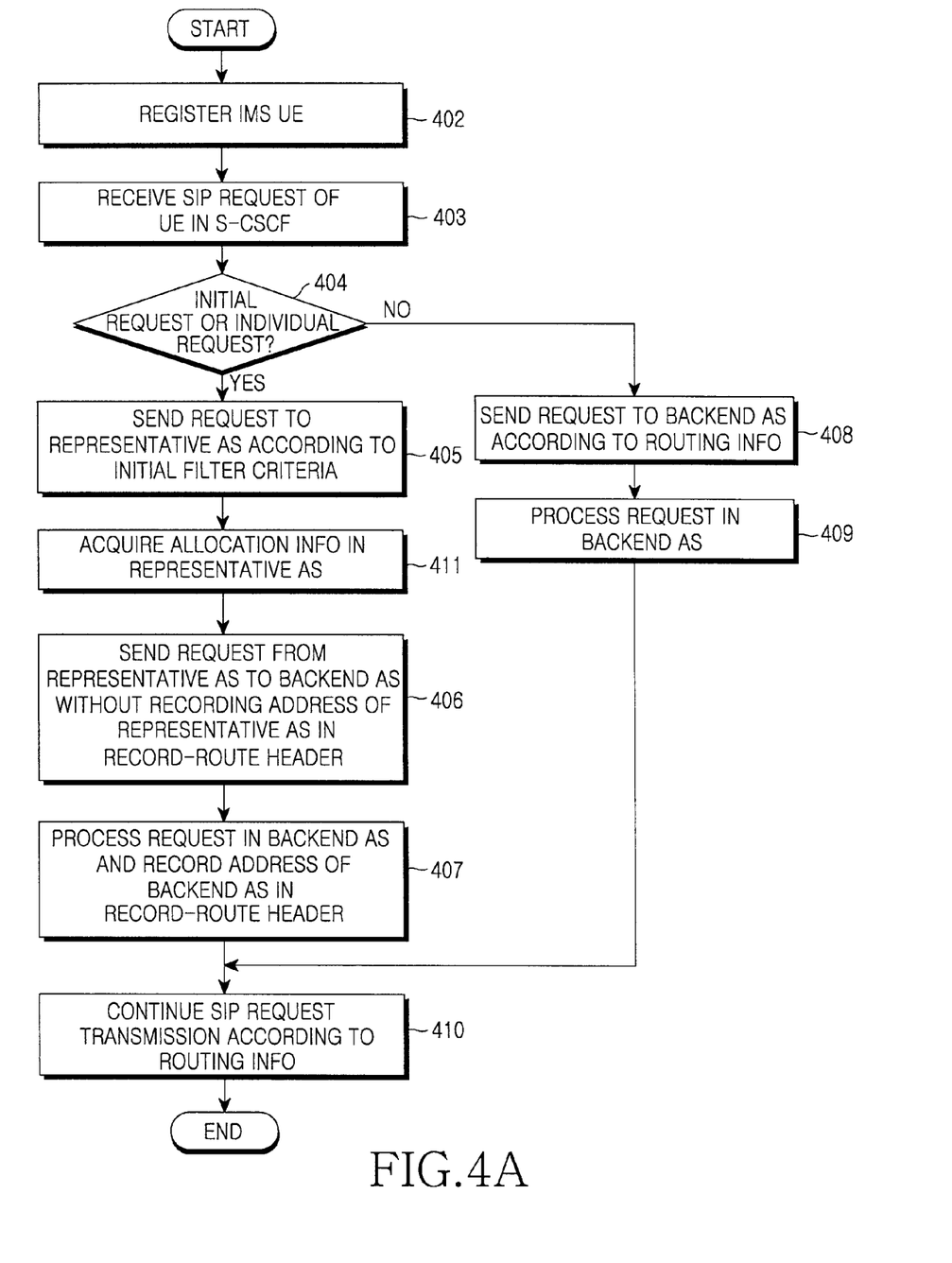
FIG. 4A illustrates an operation in which an AS receives a service request message from a UE in accordance with the present invention.

FIG. 4A illustrates a process in which a request message sent from a UE is processed in a representative AS and a backend AS through an S-CSCF in accordance with the present invention.

Referring to FIG. 4A, the UE sends a service request message to an IMS domain in step 402. The S-CSCF receives the request message of the UE through an SIP in step 403. The S-CSCF checks a type of the request message by determining whether the request message is an initial request message for generating a dialog, an individual request message that is not included in the dialog, or a subsequent request message in step 404.

If the request message is determined to be the initial request message for generating the dialog or the individual request message that is not included in the dialog in step 404, the process proceeds to step 405.

In step 405, the S-CSCF sends the request message to a specific representative AS according to filtering after applying initial filter criteria on the basis of subscriber information of the UE.

In step 411, the representative AS selects a backend AS for processing the request message. A method in which the representative AS selects the backend AS will be described in detail with reference to FIG. 4B.

In step 406, the representative AS sends the request message to the allocated backend AS. When the backend AS is allocated, an address of the representative AS is not recorded in a record-route header indicating path record information of the request message.

In step 407, the backend AS records its own address in the record-route header.

In step 410, the S-CSCF continuously sends the request message through the SIP on the basis of routing information newly set in step 407.

In the routing information, entities for processing a dialog to be subsequently generated in step 410 include the allocated backend AS. The SIP request message is sent on the basis of the routing information in which the representative AS is not included.

If the request message sent from the UE is determined to be a message belonging to an already configured dialog in step 404, however, the process proceeds to step 408 to directly send the request message to the associated backend AS on the basis of the route information of the request message.

In step 409, the backend AS processes the request message. In step 410, the S-CSCF continuously performs an associated processing operation by sending a subsequently received SIP request message on the basis of the set routing information.

Figure 4B:
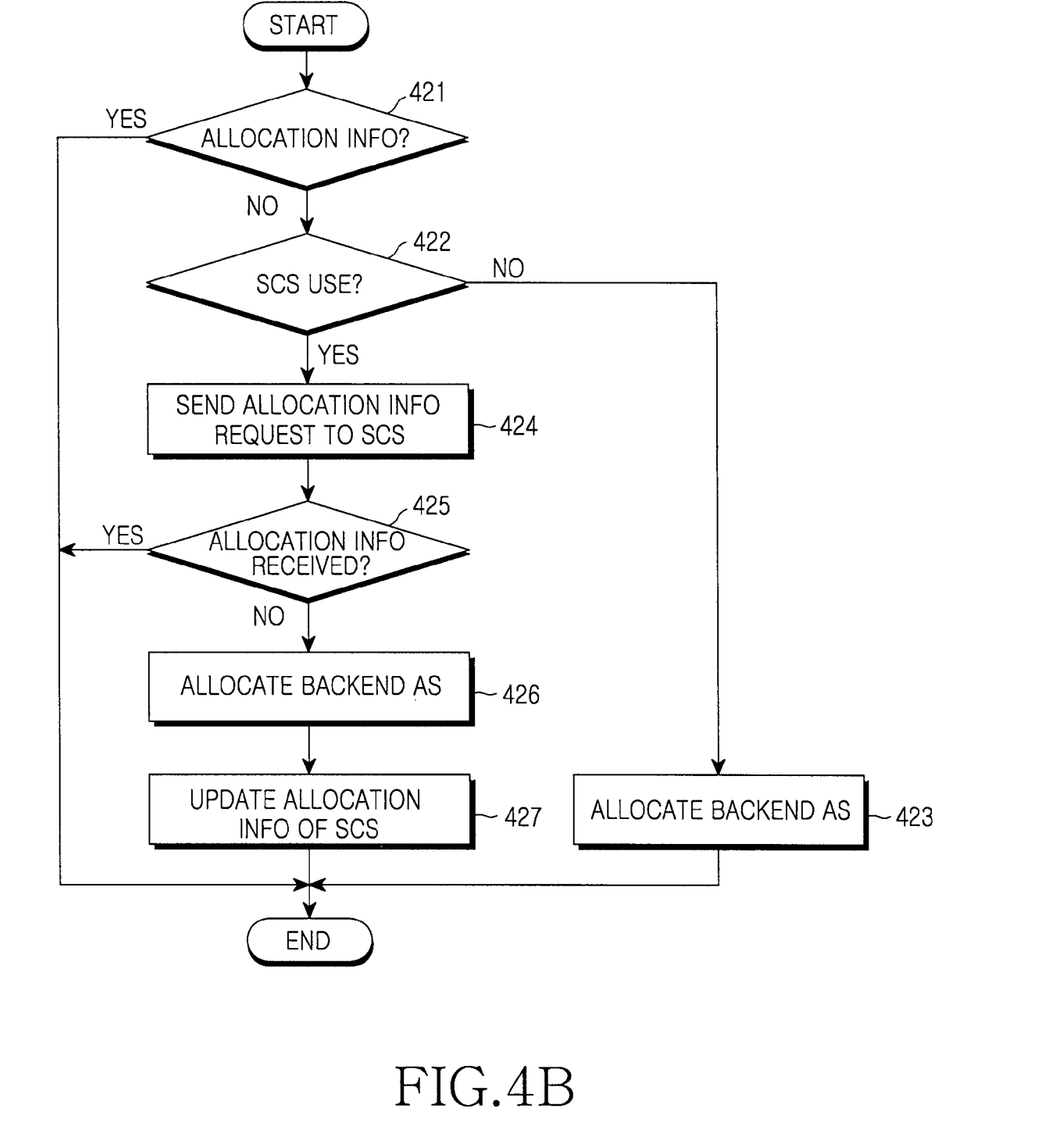
FIG. 4B illustrates an operation in which a representative AS retrieves allocation information of a backend AS in accordance with the present invention.

FIG. 4B illustrates an example of a process in which a representative AS acquires allocation information of a backend AS in accordance with the present invention. Step 411 of FIG. 4A will be described in detail with reference to FIG. 4B.

Referring to FIG. 4B, the representative AS determines whether there is backend AS allocation information for a UE sending a request message in step 421. Information regarding an already allocated backend AS mapped to subscriber information can be stored according to setting of the representative AS. Alternatively, allocation information used at the time of requesting a previous dialog or a service different from a currently requested service can be stored.

If the allocation information mapped to the UE is present, the representative AS selects the backend AS to which the request message is sent. If the allocation information is absent, the process proceeds to step 422.

In step 422, the representative AS determines whether a special SCS storing allocation information mapped to multiple UEs is set to be available. When the SCS is not used, the representative AS proceeds to step 423 to allocate an arbitrary backend AS to which the request message is sent while considering a service load state according to application program implementation.

When the SCS is used, the representative AS proceeds to step 424 to send a backend AS allocation information request to the SCS. When the representative AS receives valid backend AS allocation information mapped to the UE from the SCS in step 425, a backend AS is selected on the basis of the valid information. When the valid backend AS allocation information is not properly received from the SCS, the representative AS allocates an arbitrary backend AS while considering the service load in step 426.

In step 427, the representative AS requests that the SCS update allocation information for the associated UE to newly allocated information. At this time, the allocation information exchanged between the representative AS and the SCS can include other information required to provide a service as well as the backend AS allocation information. When the allocation information is changed, the representative AS notifies a backend AS allocated/de-allocated in a third-party registration procedure that the existing allocated backend AS has been released, if needed.

Figure 5:
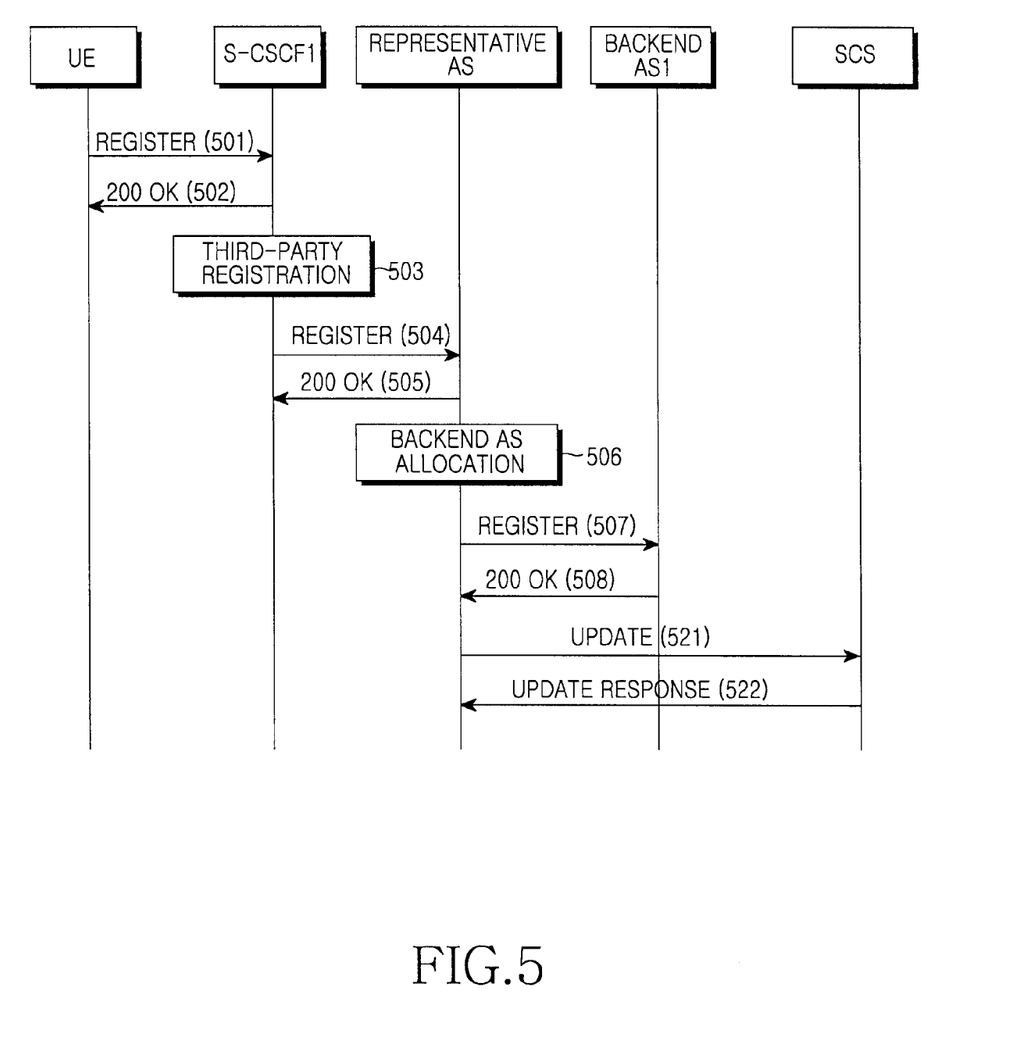
FIG. 5 illustrates a message flow between a UE and higher layers when a REGISTER request message is generated in accordance with the present invention.

FIG. 5 illustrates a control message flow between a UE and higher layers in accordance with the present invention. Specifically, FIG. 5 illustrates a control message flow in a process in which a UE is registered in an IMS domain and a representative AS allocates a backend AS through a third-party registration process.

Referring to FIG. 5, the UE sends a REGISTER request message to an IMS through an SIP in step 501. An S-CSCF #1 provides the UE with a 200 OK response message indicating that the REGISTER request message has been normally sent in step 502. The S-CSCF #1 performs the third-party registration process using subscriber information of the UE registered in an HSS in step 503. The S-CSCF #1 sends the REGISTER request message of the UE to the representative AS in step 504. The representative AS completes a response by sending a 200 OK message indicating that the REGISTER request message has been normally sent in step 505.

In step 506, the representative AS allocates a backend AS #1 for processing the request message among multiple backend ASs, and stores information regarding the allocated backend AS #1 and allocated subscriber information. For example, the subscriber information includes an SIP URI or Tel URI of the UE.

In step 507, the representative AS sends a third-party REGISTER request message to the allocated backend AS #1. In step 508, the representative AS receives a 200 OK response message indicating that the backend AS #1 has normally received the third-party REGISTER request message. At this time, the representative AS can provide the S-CSCF #1 with the 200 OK response message indicating that the backend AS #1 has normally received the third-party REGISTER request message.

When using an SCS, the representative AS can send a backend AS allocation information request to the SCS and allocate the backend AS #1 by receiving valid allocation information in steps 521 and 522. In addition, when update request and response messages are transmitted and received between the representative AS and the SCS, an operation for updating the backend AS allocation information can be completed. Although not illustrated in FIG. 5, the SCS notifies representative ASs of the changed backend AS allocation information when the backend AS allocation information stored in the SCS is changed, such that allocation information temporarily stored in an associated representative AS matches allocation information stored in the SCS. This overall process can be equally applied to procedures for re-registering and de-registering the UE.

Figure 6:
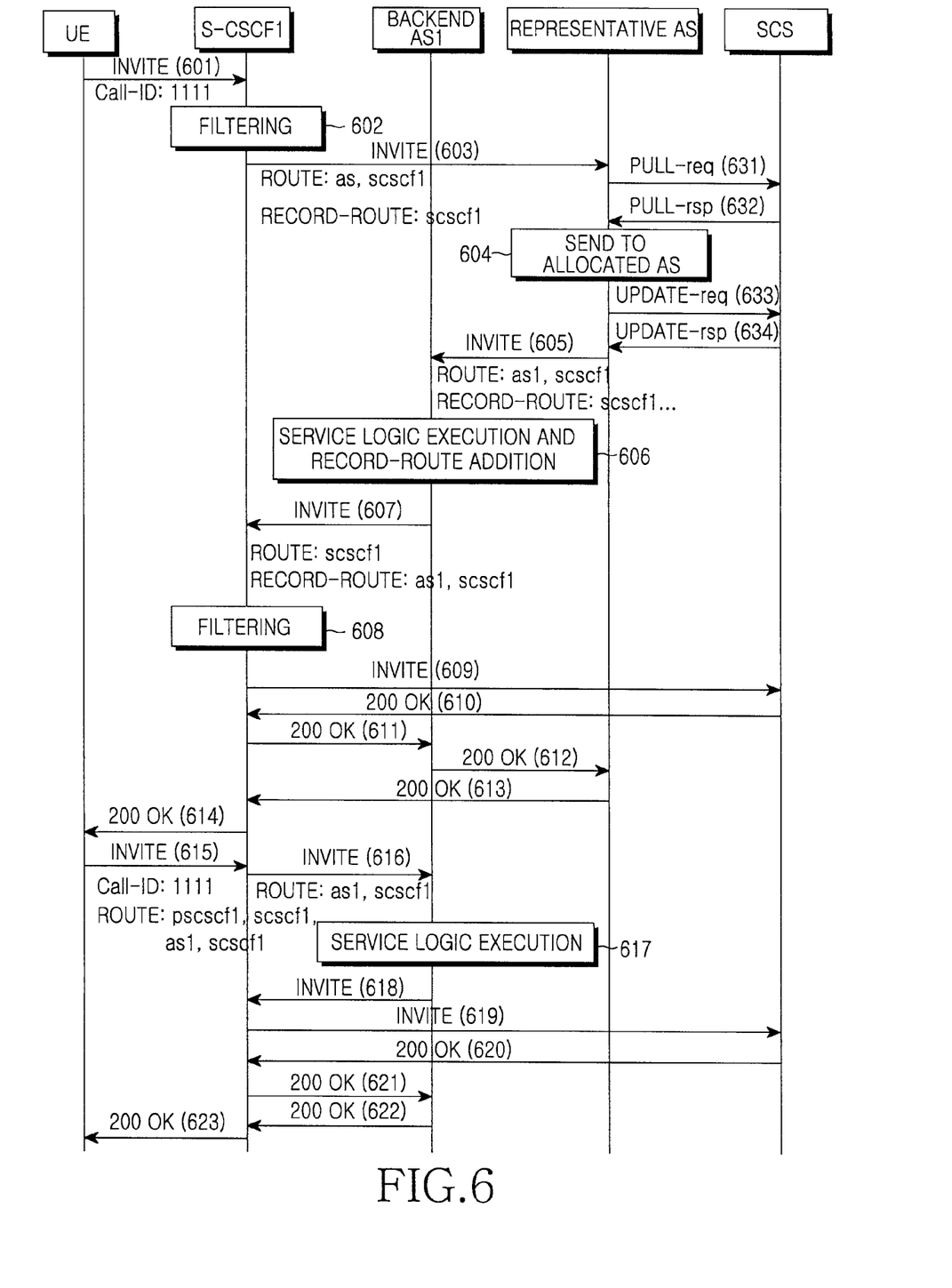
FIG. 6 illustrates a message flow between a UE and higher layers when a request message is generated in accordance with the present invention.

FIG. 6 illustrates a control message transmission/reception process when a UE sends an initial request message and a subsequent request message in accordance with the present invention.

Specifically, FIG. 6 illustrates a process for sending an initial request message for generating a dialog from the UE to an IMS domain (in steps 601 to 614) and a process for sending a subsequent request message for a subsequently generated dialog (in steps 615 to 623). An INVITE request message sent from the UE is an example of a request message for generating a dialog. Any request message can be applied.

In step 601, the INVITE request message corresponding to the initial request message for generating the dialog is send to an S-CSCF #1. The INVITE request message contains call identifier information (for example, Call ID: 1111) to distinguish the UE from other UEs. In a preferred embodiment of the present invention, the S-CSCF #1 is constructed with multiple S-CSCFs. The S-CSCF #1 indicates a specific entity operating as an S-CSCF of the UE. It is noted that the S-CSCF #1 and the S-CSCF have the same structure as each other.

In step 602, the S-CSCF #1 filters the INVITE request message received from the UE according to initial filter criteria of subscriber information. Filtering indicates that a specific one of multiple representative ASs is allocated to process the message according to specific criteria of the request message from the UE.

A preferred embodiment of the present invention in which the representative AS processes the message according to initial filter criteria will be described. In step 603, the S-CSCF #1 sets an address of the representative AS based on the initial filter criteria and an address of the S-CSCF #1 in a route header based on a transmission path of the INVITE request message. Then the INVITE request message is sent to the representative AS.

In other words, the S-CSCF #1 provides the representative AS with the INVITE request message corresponding to the initial request message on the basis of the transmission path set in the route header to send a request for generating the dialog to the representative AS in step 603. The S-CSCF #1 records its own path record information in a record-route header of the INVITE request message.

In step 604, the representative AS retrieves backend AS allocation information. The allocation information can be acquired from information internally stored in the representative AS or a special database SCS storing the allocation information.

Next, a control message transmission/reception process will be described when the SCS is used in relation to step 604.

When the SCS is used, the representative AS sends a backend AS allocation information request to the SCS, if needed, in step 631. The allocation information request message (PULL-req) includes subscriber information and a service type. When receiving backend AS allocation information from the SCS through an allocation information response message (PULL-rsp) in step 632, the representative AS selects a backend AS to which an INVITE request message is sent using the allocation information in step 604.

If backend AS allocation information is not included in the allocation information response message (PULL-rsp) received in step 632, the representative AS allocates a proper backend AS #1 of multiple backend ASs while considering a load state and updates the backend AS allocation information stored in the SCS in steps 633 and 634.

Although not illustrated in FIG. 6, the SCS notifies representative ASs of changed backend AS allocation information when the backend AS allocation information stored in the SCS is changed, such that allocation information temporarily stored in an associated representative AS matches allocation information stored in the SCS.

In step 605, the representative AS sends the INVITE request message to the selected backend AS #1. The representative AS can store information regarding the selected backend AS #1, if needed. The stored information can be used later as path information when a subsequent message is transmitted.

When the representative AS does not use the SCS, steps 631 to 634 can be skipped. In this case, a message processing operation is as follows.

If the representative AS knows information regarding a backend AS pre-allocated to the UE, it is assumed that the backend AS #1 is the pre-allocated backend AS. In step 605, the representative AS immediately sends the INVITE request message to the allocated backend AS #1. If a specific backend AS is not pre-allocated to the UE or allocation information is not known, the representative AS allocates an arbitrary backend AS while considering the service load state.

In step 605, the representative AS sends the INVITE request message to the allocated backend AS #1. The representative AS can store information regarding the allocated backend AS #1 and subscriber information, if needed. The subscriber information includes an SIP URI, a Tel URI, or the like.

At this time, the representative AS for sending the INVITE request message to the backend AS #1 does not record its own address in the record-route header containing path record information. That is, in step 605, the representative AS records an address of the backend AS #1 and an address of the S-CSCF #1 in the route header indicating a transmission path, records only the address of the S-CSCF #1 in the record-route header containing the path record information, and sends the INVITE request message to the allocated backend AS #1.

The backend AS #1 executes service logic mapped to the INVITE request message in step 606 and sends the INVITE request message to the S-CSCF #1 on the basis of the route header in step 607. At this time, the address of the backend AS #1 and the address of the S-CSCF #1 are recorded and stored as the path record information in the record-route header of the INVITE request message.

In steps 608 to 613, the remaining processes are performed in which the INVITE request message is normally communicated between network entities and reception completion is reported.

As a result, the UE receives, from the S-CSCF #1, a 200 OK response message indicating that the INVITE request message has been normally processed in the network entities in step 614. At this time, the 200 OK response message contains the record-route header containing path record information for enabling direct communication to the backend AS #1 in a state in which the representative AS is excluded. Thus the UE stores the record-route header as the path record information and uses the stored information as path information of a route header when a subsequent request message is generated.

Steps 615 to 623 involve sending/receiving the subsequent request message when the UE generates the subsequent request message within a dialog generated using an initial INVITE request message. The INVITE request message is an example of the subsequent request message. In the same dialog, any subsequent request message can be applied.

In step 615, the UE sets the route header containing path information for sending a subsequent INVITE request message using the record-route header containing the path record information for the initial INVITE request message. The UE sends the subsequent INVITE request message to an IMS network. In step 615, the subsequent INVITE request message contains call identifier information (Call ID: 1111) for distinguishing the UE from other UEs and contains path information of a P-CSCF #1, S-CSCF #1, backend AS #1 and S-CSCF #1 in the route header.

Since a transmission path of the subsequent INVITE request message follows the path information contained in the route header, the subsequent INVITE request message is sent from the S-CSCF #1 to the backend AS #1 without passing through the representative AS in step 616.

The backend AS #1 executes service logic mapped to the subsequent INVITE request message in step 617 and sends the subsequent INVITE request message to the S-CSCF #1 on the basis of the route header in step 618.

In steps 619 to 623, the remaining processes are performed in which the subsequent INVITE request message is normally communicated between network entities and reception completion is reported.

When a subsequent message is sent, the message is sent to a specific backend AS without passing through a representative AS with a load distribution function, such that message transmission delay and delay due to re-transmission can be prevented and a message processing time in entities can be reduced.

Figure 7:
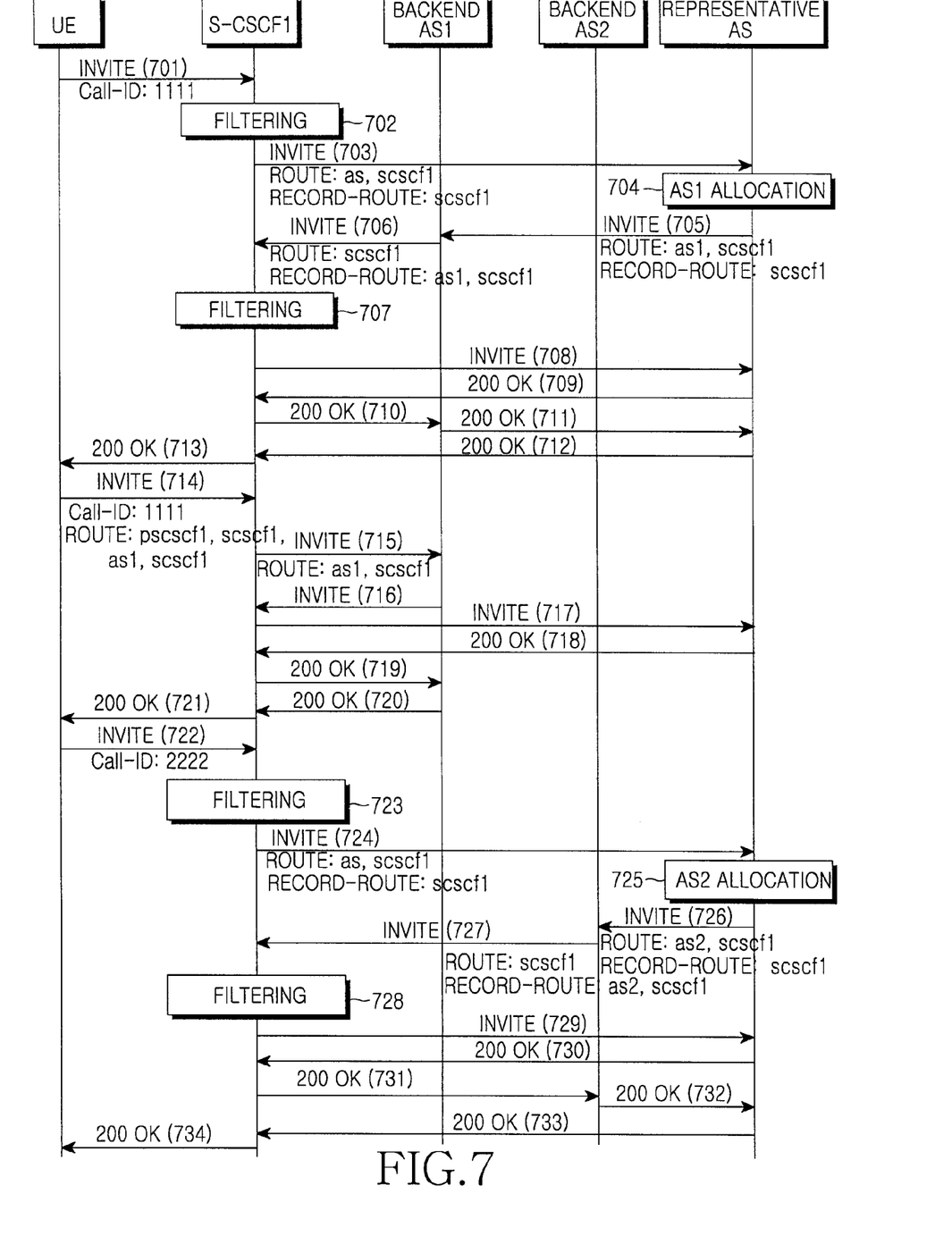
FIG. 7 illustrates a control message flow when a UE sends an initial request message and a subsequent request message when a representative AS does not know an allocation state of a backend AS in accordance with the present invention.

FIG. 7 illustrates a control message transmission/reception process when a representative AS does not know a user allocation state for a backend AS and does not use an SCS in accordance with the present invention.

Since steps 701 to 721 except step 704 of FIG. 7 are the same as those of FIG. 6, a description thereof will be omitted here.

In particular, the representative AS sends a message after newly allocating a backend AS for a UE or service whenever an initial request message is received since the representative AS does not know a user allocation state for a backend AS in step 704. At this time, the representative AS allocates a backend AS #1 as an AS for the UE.

In step 722, the UE sends, to an IMS domain, an initial INVITE request message for generating another dialog that does not belong to an existing generated dialog. The UE sends, to an S-CSCF #1, the INVITE request message containing call identifier information (Call ID: 2222) different from call identifier information (Call ID: 1111) of a previous INVITE request message.

In step 723, an AS for the INVITE request message containing the call identifier information (Call ID: 2222) is determined to be a representative AS according to initial filter criteria. In step 724, the INVITE request message containing the call identifier information (Call ID: 2222) is sent to the representative AS. At this time, the INVITE request message is sent in which an address of the representative AS and an address of the S-CSCF #1 are stored in a route header and only the address of the S-CSCF #1 is stored in a record-route header.

In step 725, the representative AS newly allocates a backend AS #2 since the representative AS does not know a backend AS allocation state for the UE. In step 726, the representative AS sends, to the backend AS #2, an INVITE request message in which an address of the backend AS #2 and the address of the S-CSCF #1 are set in the route header and the address of the S-CSCF #1 is set in the record-route header.

In step 727, the newly allocated backend AS #2 sends, to the S-CSCF #1, the INVITE request message in which the address of the backend AS #2 is recorded in the route header and the address of the backend AS #2 and the address of the S-CSCF #1 are recorded in the record-route header.

Steps 728 to 734 of processing the INVITE request message are the same as those of FIG. 6, so a description thereof will be omitted here.

In step 734, the UE receives a 200 OK response message indicating that the INVITE request message due to the other dialog has been normally processed. In the 200 OK response message, the record-route header contains path record information indicating that the message has been sent to/through the newly allocated backend AS #2.

In the present invention as described above, an IMS network entity sends an initial request of a user (or UE) to a representative AS, which in turn sends the received request to a backend AS pre-allocated to the user at the time of registering the UE or processes the message by allocating a new backend AS suitable for the purpose of service according to load state. At this time, the representative AS processes the request message with multiple backend ASs using an SIP standard.

Therefore, the present invention is advantageous in that interoperability between ASs of different manufacturers with the same function is ensured and the call processing capacity of an AS is simultaneously extended.

Figure 8:
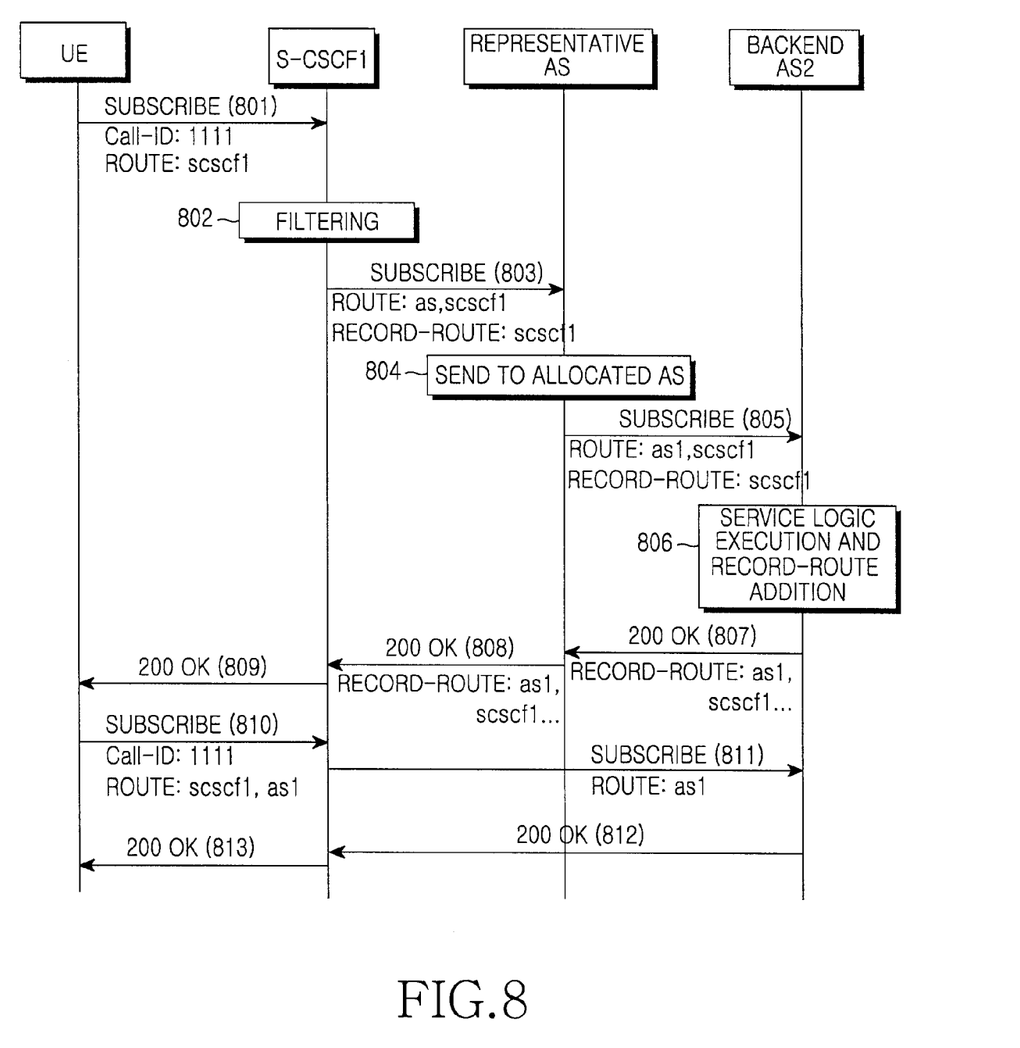
FIG. 8 illustrates a control message flow when a UE sends a request message when a backend AS operates as a User Agent (UA) in accordance with the present invention.

FIG. 8 illustrates a control message transmission/reception process when a backend AS operates as a User Agent (UA) in accordance with the present invention.

In FIG. 8, a SUBSCRIBE request message is an example in which the AS operates as the UA. Any request message can be applied. When the AS operates as the UA, the UE can send the message by setting a request URI of a target server to an AS address (or Public Service Identity (PSI)) or a sub domain PSI. Thus the UE should explicitly include path information up to a backend AS in a subsequent request message in order to directly send the subsequent request message to the backend AS allocated by the representative AS.

Referring to FIG. 8, the UE sends, to an S-CSCF #1, the SUBSCRIBE request message containing call identifier information (Call ID: 1111) such that the UE can be distinguished from other UEs in step 801. At this time, a route header of the SUBSCRIBE request message is set to an address of the S-CSCF #1.

In step 802, the S-CSCF #1 filters the received SUBSCRIBE request message according to initial filter criteria. At this time, an AS registered by the initial filter criteria is a representative AS. Thus, the S-CSCF #1 sets its own address and an address of the representative AS in the route header indicating a transmission path of the SUBSCRIBE request message in step 803. In addition, the S-CSCF #1 records only its own address in a record-route header.

In step 804, the representative AS retrieves backend AS allocation information using information internally stored in the representative AS or an SCS storing the allocation information. Then, the representative AS sends the SUBSCRIBE request message to a selected backend AS #1. At this time, the representative AS sends the SUBSCRIBE request message in which an address of the backend AS #1 and the address of the S-CSCF #1 are set in the route header and only the address of the S-CSCF #1 is set in the record-route header.

In step 806, the backend AS #1 executes service logic mapped to the SUBSCRIBE request message. In step 807, the backend AS #1 adds its own address to an uppermost end of the record-route header and sends a response when the response to the SUBSCRIBE request message is generated. That is, the address of the S-CSCF #1 and the address of the backend AS #1 are recorded in the record-route header of the response message to be sent to the UE.

When receiving the response to the SUBSCRIBE request message, the UE stores path record information contained in the record-route header in step 809. When sending a re-SUBSCRIBE request message, the UE sets path information of a new message using the stored path record information of the record-route header in step 810. That is, in step 810, the UE sets information of the record-route header of a previous SUBSCRIBE request message in the route header such that a new SUBSCRIBE request message can be directly sent to the backend AS #1.

Thus, the S-CSCF #1 sends the new SUBSCRIBE request message in which the address of the backend AS #1 is set in the route header in step 811. The UE receives a 200 OK response message indicating that the backend AS #1 has normally received the SUBSCRIBE request message in steps 812 and 813.

Figure 9:
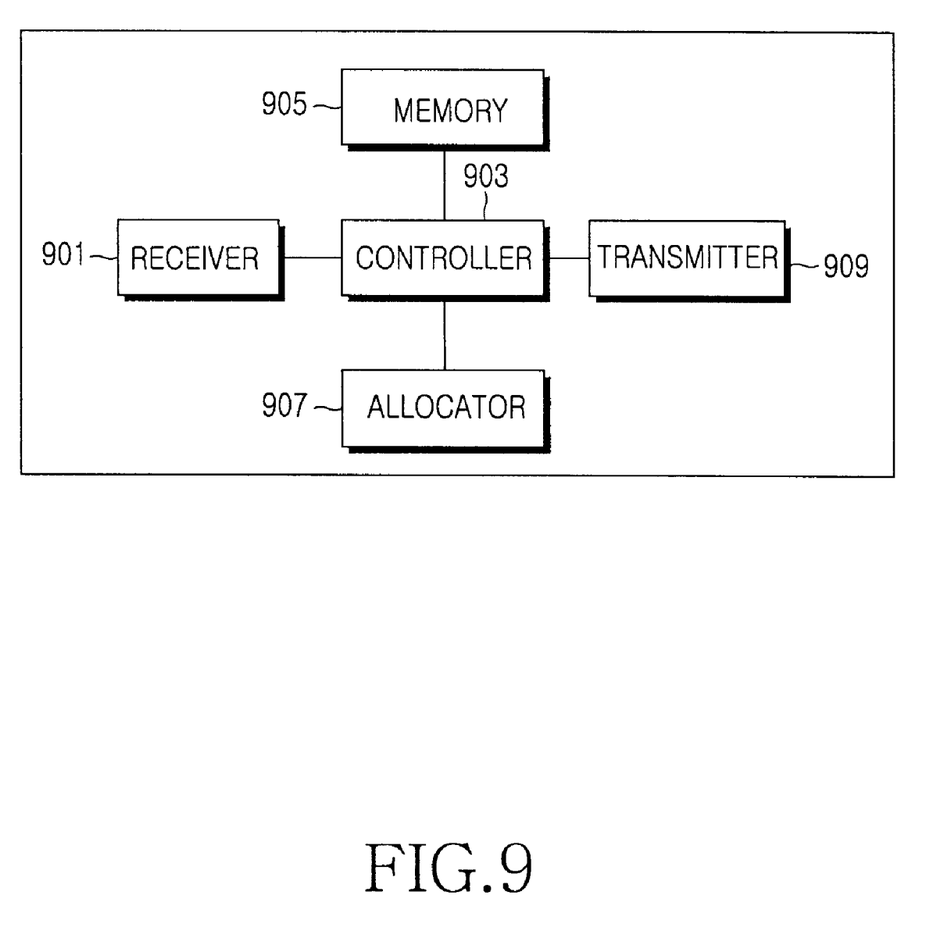
FIG. 9 illustrates a structure of a representative AS in accordance with the present invention.

FIG. 9 illustrates a structure of a representative AS in accordance with the present invention.

Referring to FIG. 9, a receiver 901 receives control messages from network entities of an IMS such as a UE, S-CSCF, backend AS and SCS.

A controller 903 performs an overall operation for processing a received control message and exchanges required information with an allocator 907 and a memory 905.

The memory 905 stores data required for processing a control message. For example, transmission path information of an initial request message can be stored and used as that of a subsequent request message. Alternatively, the memory 906 can store, for example, backend AS allocation information for a specific UE from which a previous request message has been sent. When receiving a request message from the UE, the controller 903 can allocate a transmission path or backend AS by reading required data from the memory 905.

The allocator 907 includes an algorithm for allocating a backend AS, for example. A transmitter 909 sends control messages to the network entities of the IMS such as a UE, S-CSCF, backend AS and SCS.

Figure 10:
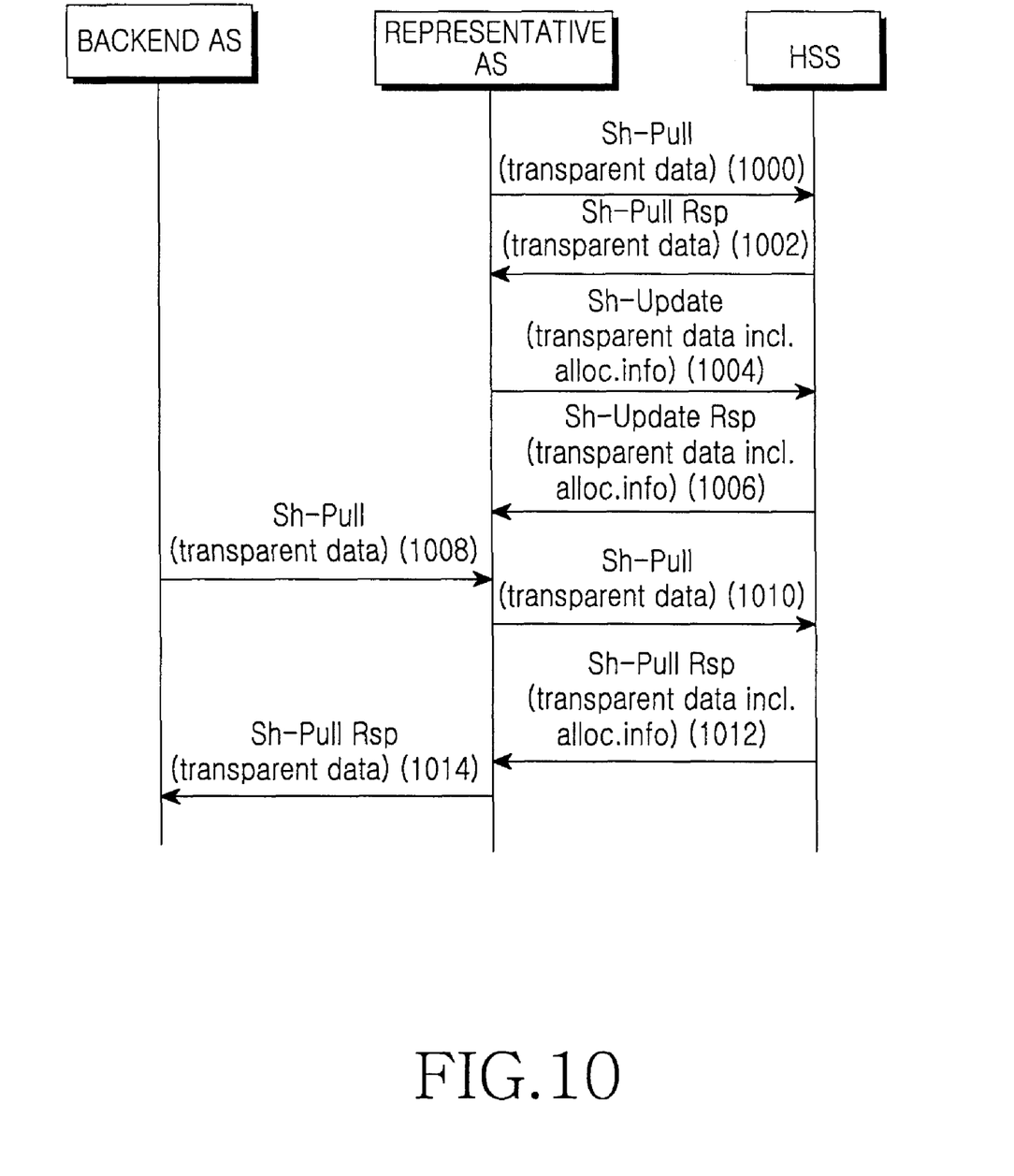
FIG. 10 illustrates a control message transmission/reception process among a home subscriber server, a representative AS and a backend AS in accordance with the present invention.

FIG. 10 illustrates a control message transmission/reception process among an HSS, a representative AS and a backend AS when the HSS is used as an SCS in accordance with the present invention. When the HSS is used as the SCS, the HSS can store backend AS allocation information in a repository data area for the purpose of storing service-by-service transparent data for users. Herein, the transparent data is unique service data and cannot be used in others except the HSS and an AS(s) for providing an associated service.

Referring to FIG. 10, the representative AS sends an Sh-Pull request 1000 to the HSS via an Sh interface, on which the AS and the HSS communicates with each other, to register backend AS allocation information in the HSS, and receives transparent data stored in the HSS using a response 1002. Herein, the Sh is defined as an interface between an AS and an HSS in the Standard, and does not include any specific meaning.

The representative AS sends an Sh-Update request 1004 to the HSS after adding the backend AS allocation information to the transparent data downloaded from the HSS and receives a response 1006. Both the backend AS allocation information and the transparent data are stored in the HSS.

At this time, the transparent data stored in the HSS includes the backend AS allocation information. When the backend AS sends a transparent data request to the HSS, a wrong operation may occur since the backend AS allocation information is sent along with the transparent data.

To prevent such a wrong operation, the backend AS indirectly requests the transparent data by sending an Sh-Pull request 1008 to the representative AS. The representative AS sends, to the backend AS, only the remaining transparent data by excluding the backend AS allocation information from the transparent data received from the HSS (as indicated by reference numeral 1014). When the representative AS internally stores the transparent data, an Sh-Pull request 1010 and a response 1012 between the representative AS and the HSS can be skipped.

Particularly, in steps 1008 to 1014, the representative AS provides the backend AS with transparent data excluding backend AS allocation information although the transparent data including the backend AS allocation information is received from the HSS when the backend AS requests the transparent data. Therefore, the wrong operation is prevented.

As is apparent from the above description, the present invention has at least the following advantages.

The present invention can ensure interoperability, that is, compatibility, between ASs of different-manufacturers with the same function by sending and receiving a control message required for a call connection on the basis of an SIP in an IMS mobile communication system. Therefore, the call processing capacity of an AS of the IMS can be extended.

Moreover, the present invention can distribute request messages to be processed in the ASs by sending the messages through a standard SIP in a hierarchical AS structure of an AS group of the IMS. In the higher concept, transmission delay due to message processing and re-transmission delay is prevented.

In other words, a bottleneck situation in a higher server is reduced and a path of a re-request control signal can be shortened.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for processing a request message from a User Equipment (UE) in an Internet protocol-based mobile communication system supporting a multimedia service, comprising:

sending, by the UE, an INVITE request to a Serving-Call Session Control Function (S-CSCF) to create a new dialog;

sending, by the S-CSCF, the INVITE request to a representative application server from one or more representative application servers;

allocating, by the representative application server, a specific lower-layer application server from at least one lower-layer application server, and sending the INVITE request to the specific lower-layer application server by recording only an address of the specific lower-layer application server and an address of the S-CSCF in a record-route of the INVITE request;

processing, by the specific lower-layer application server, the INVITE request and sending a first response to the representative application server;

sending, by the representative application server, the first response to the S-CSCF;

sending, by the S-CSCF, the first response to the UE;

sending, by the UE, a subsequent INVITE request in the new dialog to the S-CSCF;

directly sending, by the S-CSCF, the subsequent INVITE request to the specific lower-layer application server according to the record-route of the INVITE request;

processing, by the specific lower-layer application server, the subsequent INVITE request and sending a second response to the S-CSCF; and sending, by the S-CSCF, the second response to UE, wherein the representative application server selects the specific lower-layer application server according to user allocation information, and wherein the INVITE request is forwarded to the representative application server according to initial filter criteria at the S-CSCF.

2. The method of claim 1, wherein the representative application server is selected for processing the INVITE request mapped to a specific service requested by the UE from one or more representative application servers.

3. The method of claim 1, wherein the representative application server allocates the specific lower-layer application server from at least one lower-layer application server while considering a load state when the allocation information mapped to the UE is not received from the database server, and updates the allocation information of the lower-layer application server for the UE in the database server through the session initiation protocol.

4. The method of claim 3, wherein the representative application server stores service-by-service transparent data including the allocation information of the specific lower-layer application server in a home subscriber server, and sends transparent data to the specific lower-layer application server by excluding the allocation information of the specific lower-layer application server from the stored transparent data when a transparent data request from the specific lower-layer application server is detected.

5. An Internet protocol network system for use in an Internet protocol-based mobile communication system supporting a multimedia service, the system processing a request message from a User Equipment (UE), comprising:

the UE for sending an INVITE request to a Serving-Call Session Control Function (S- CSCF) to create a new dialog, and sending a subsequent INVITE request in the new dialog to the S-CSCF;

the S-CSCF for sending the INVITE request to a representative application server from one or more representative application servers, sending a first response to the UE when the first response is received from the representative application server, directly sending the subsequent INVITE request to a specific lower-layer application server according to a record-route of the INVITE request, and sending a second response to the UE when the second response is received from the specific lower-layer application server;

the representative application server for allocating a specific lower-layer application server from at least one lower-layer application server, sending the INVITE request to the specific lower-layer application server by recording only an address of the specific lower-layer application server and an address of the S-CSCF in a record-route of the INVITE request, and sending the first response to the S-CSCF when the first response is received from the specific lower-layer application server; and the specific lower-layer application server for processing the INVITE request and sending the first response to the representative application server, and processing the subsequent INVITE request and sending the second response to the S-CSCF, wherein the representative application server selects the specific lower-layer application server according to user allocation information, and wherein the INVITE request is forwarded to the representative application server according to initial filter criteria at the S-CSCF.

6. The system of claim 5, wherein the representative application server is selected for processing the INVITE request mapped to a specific service requested by the user equipment from one or more representative application servers.

7. The system of claim 5, wherein the representative application server allocates the specific lower-layer application server at least one lower-layer application server while considering a load state when the allocation information mapped to the UE is not received from the database server, and updates the allocation information of the lower-layer application server for the UE in the database server through the session initiation protocol.

8. The system of claim 7, wherein the representative application server stores service-by-service transparent data including the allocation information of the specific lower-layer application server in a home subscriber server, and sends transparent data to the specific lower-layer application server by excluding the allocation information of the specific lower-layer application server from the stored transparent data when a transparent data request from the specific lower-layer application server is detected.

* * * * *